US006967655B1

(12) United States Patent
Goto

(10) Patent No.: US 6,967,655 B1
(45) Date of Patent: Nov. 22, 2005

(54) CHARACTER-STRING INFORMATION OUTPUT APPARATUS, CHARACTER-STRING INFORMATION OUTPUT SYSTEM, CHARACTER-STRING INFORMATION OUTPUT METHOD, CHARACTER-STRING INFORMATION INPUT APPARATUS, CHARACTER-STRING INFORMATION INPUT SYSTEM, CHARACTER-STRING INFORMATION INPUT METHOD, STORAGE MEDIUM AND CHARACTER-STRING INFORMATION RECORDING APPARATUS

(75) Inventor: Shinya Goto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/546,682

(22) Filed: Apr. 11, 2000

(30) Foreign Application Priority Data

Apr. 13, 1999 (JP) .................................. 11-105104
Nov. 19, 1999 (JP) .................................. 11-329734

(51) Int. Cl.[7] .......................... G06T 11/00; G09G 5/26; G06K 9/00; G06K 9/18
(52) U.S. Cl. ................ 345/467; 345/471.2; 345/472.3; 382/181; 382/182; 382/185
(58) Field of Search ................................ 345/619, 636, 345/676, 685, 467, 471, 472–3; 382/181–182, 382/185, 190, 198, 202, 187, 218, 225, 228, 382/232, 132

(56) References Cited

U.S. PATENT DOCUMENTS 5,300,978 A * 4/1994 Miyasaka .................. 354/412
5,319,574 A * 6/1994 Ikeda ......................... 711/100
5,546,538 A * 8/1996 Cobbley et al. ............ 709/203
5,821,929 A * 10/1998 Shimizu et al. ............. 345/706
5,870,084 A * 2/1999 Kanungo et al. ........... 345/192
5,890,184 A * 3/1999 Ooishi ........................ 715/542
5,963,666 A * 10/1999 Fujisaki et al. ............. 382/187
5,966,637 A * 10/1999 Kanungo et al. ............ 455/6.2
6,204,782 B1 * 3/2001 Gonzalez et al. ............. 341/90
6,426,751 B1 * 7/2002 Patel et al. ................. 345/468
6,445,458 B1 * 9/2002 Focazio et al. .............. 358/1.1

* cited by examiner

Primary Examiner—Matthew C. Bella
Assistant Examiner—Wesner Sajous
(74) Attorney, Agent, or Firm—Fitzpatrick, Cella, Harper & Scinto

(57) ABSTRACT

There is provided a character-string information output apparatus that can avoid any confusion due to a difference between character string commands, and that can improve its expandability.

An image writing apparatus analyzes commands identical in information content to character string information to which an input instruction has been issued. The analyzed support commands are all written onto a nonvolatile memory through a card drive. On the other hand, an electrophotographic image processing apparatus searches a DPOF file on the nonvolatile memory for all commands through a card read drive. From among the searched commands, a command that the electrophotographic image processing apparatus can support is extracted as a target command for the electrophotographic image processing apparatus. Then, the ROM is searched to determine whether there is font information to output the character string information included in the extracted command, so that the character string information is outputted based on the searched font information.

11 Claims, 7 Drawing Sheets

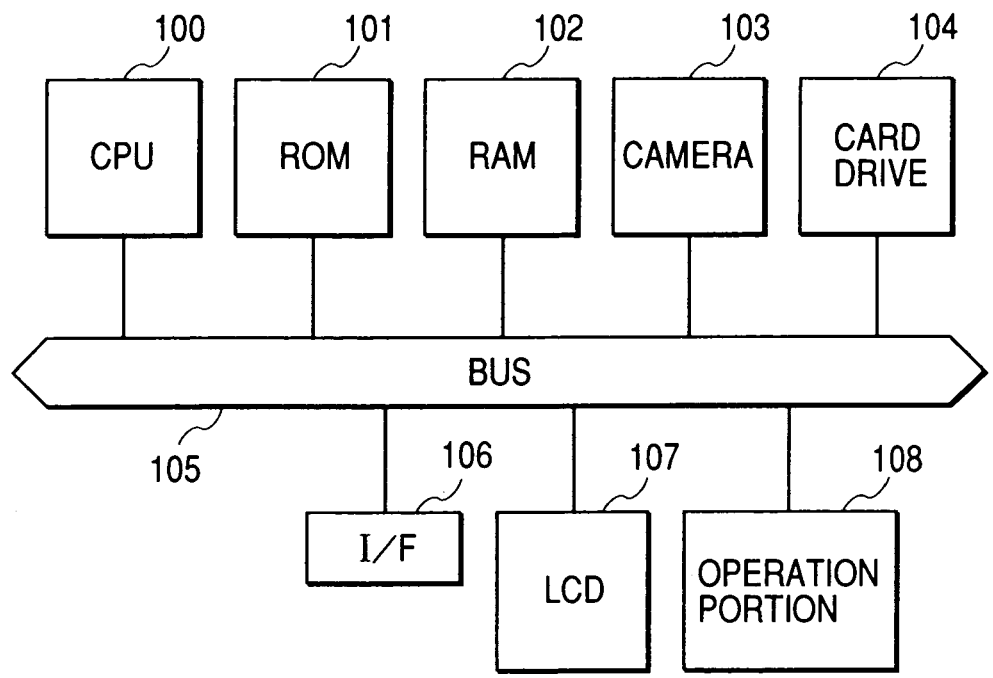
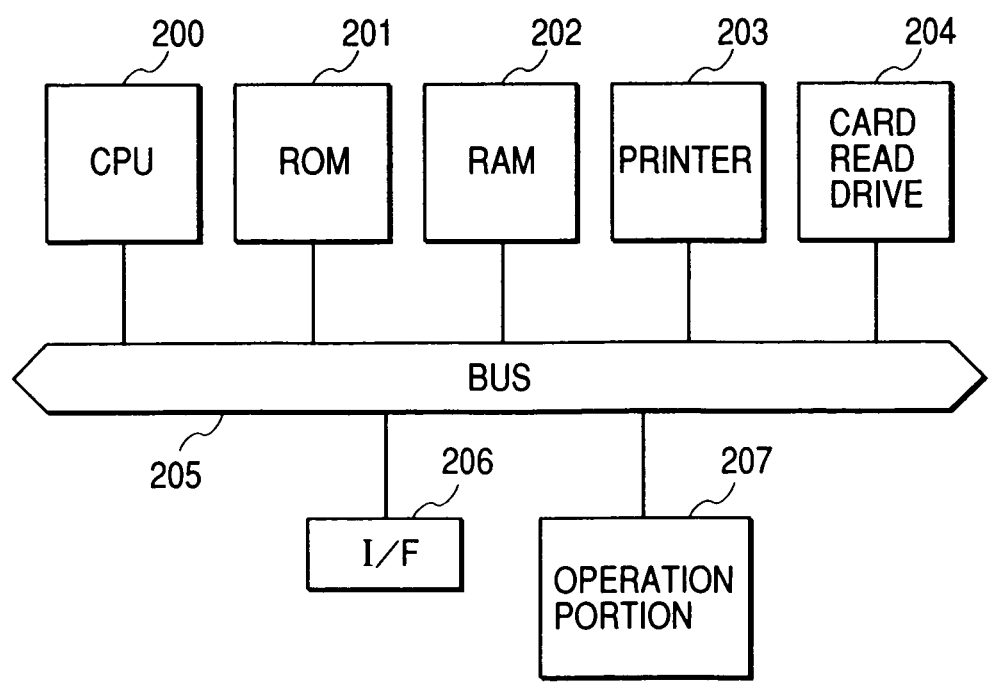

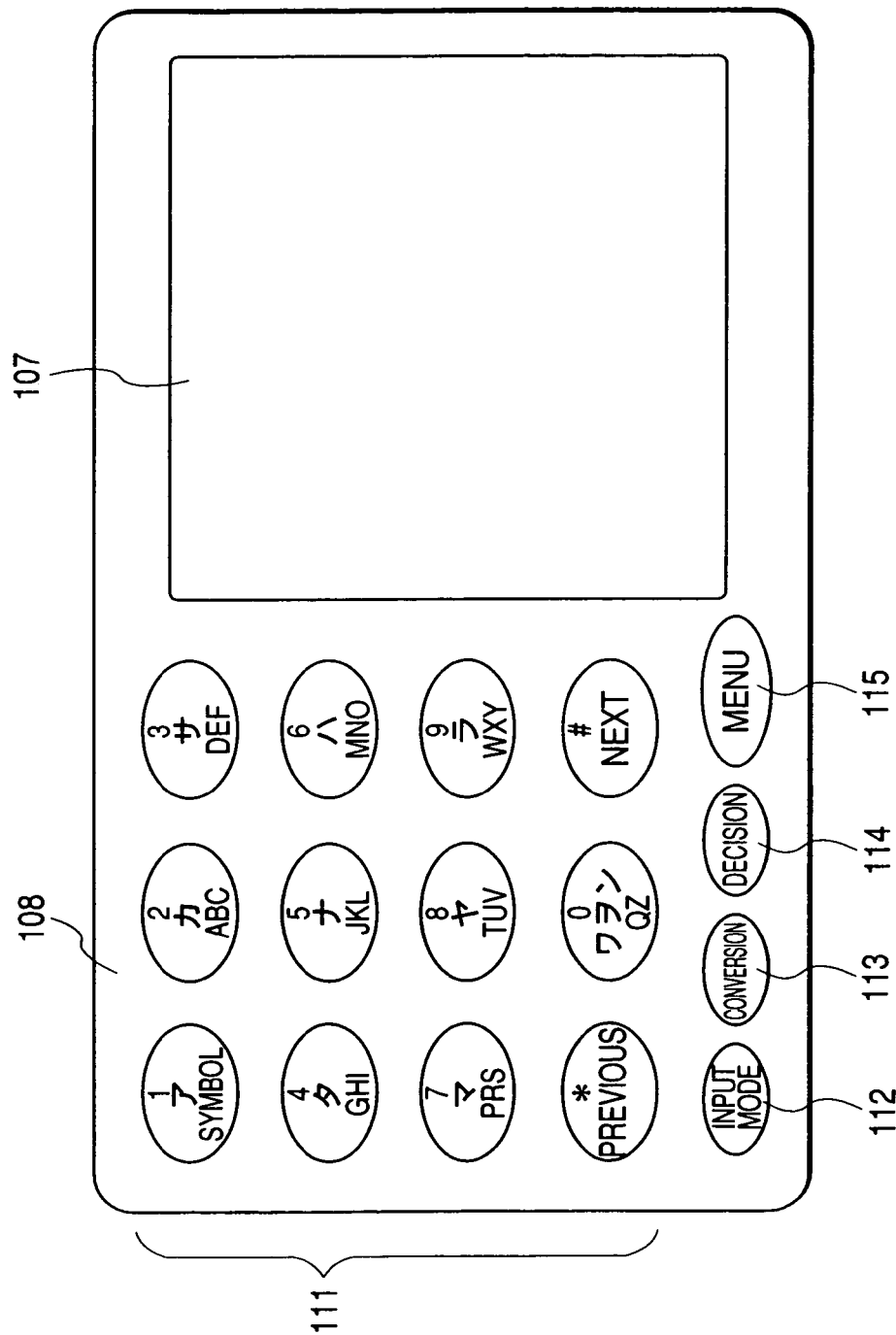

CHARACTER-STRING INFORMATION OUTPUT APPARATUS, CHARACTER-STRING INFORMATION OUTPUT SYSTEM, CHARACTER-STRING INFORMATION OUTPUT METHOD, CHARACTER-STRING INFORMATION INPUT APPARATUS, CHARACTER-STRING INFORMATION INPUT SYSTEM, CHARACTER-STRING INFORMATION INPUT METHOD, STORAGE MEDIUM AND CHARACTER-STRING INFORMATION RECORDING APPARATUS

BACKGROUND OF THE INVENTION

1. Field of the Invention

The present invention relates to a character-string information output apparatus for outputting character string information in a command format. It also relates to a character-string information output system, a character-string information output method, a character-string information input apparatus, a character-string input system, a character-string information input method, a storage medium and a character-string information recording apparatus, for use with the character-string information output apparatus.

2. Related Background Art

For this type of image pick-up apparatus or electrophotographic image processing apparatus, a standard, called Digital Print Order Format (DPOF: a pending trademark), has recently been established. The use of a specific file (DPOF file) on a recording medium with images taken by a digital camera thereon allows a user to select an image to be printed at a lab or on a printer, or to specify the number of copies to be printed.

The contents of the specific file are interpreted at the lab or on the printer, so that the image taken by the digital camera and specified by the user can be printed as specified.

The specific file on the recording medium contains a command with a character string such as the useris name or address recorded therein. However, the current DPOF version 1.00 only supports ASCII codes as single-byte character strings or Shift_JIS codes as double-byte character strings.

The conventional DPOF is adaptable to languages represented by 26 letters of the alphabet like English and languages represented in Shift_JIS code like Japanese, but it is not adaptable to the other languages such as some European languages like German, Russian, Thai, Arabic and Greek.

Further, if a command with a character string in Shift_JIS code is processed in a Shift_JIS-incapable electrophotographic image processing apparatus, the resulting printout or display can carry unexpected symbols or characters.

The current DPOF version may be updated so that the command can be specialized in a universal character code, such as Unicode, different from the conventional character codes. In this case, however, electrophotographic image processing apparatuses adapted to old commands alone can also print out or display unexpected symbols or characters.

It is therefore an object of the present invention to provide a character-string information output apparatus, a character-string information output system, a character-string information output method, a character-string information input apparatus, a character-string information input system, a character-string input method, a storage medium and a character-string information recording apparatus, all of which can avoid any confusion due to a difference between character-string commands, and improve their expandability.

SUMMARY OF THE INVENTION

In one aspect of the present invention, there is provided a character-string information output apparatus for outputting character string information in a command format. The character-string information output apparatus comprises a search means that performs searches for plural commands identical in content, a command extraction means that extracts an interpretable command from the searched plural commands, and a character-string information output means that outputs the character string information of the extracted command.

BRIEF DESCRIPTION OF THE DRAWINGS

FIG. 1 is a block diagram illustrating the structure of an image writing apparatus (writer);

FIG. 2 is a block diagram illustrating the structure of an electrophotographic image processing apparatus (reader);

FIG. 7 is a front view illustrating the appearance of a digital camera according to a second embodiment of the present invention;

DESCRIPTION OF THE PREFERRED EMBODIMENTS

Figure 3:
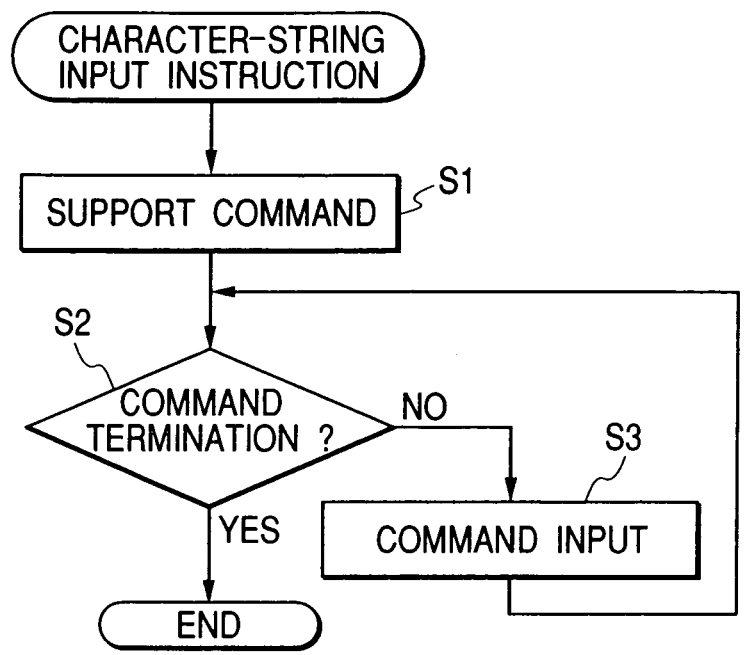
FIG. 3 is a flowchart illustrating the process to input character-string command information as the electrophotographic image processing in the image writing apparatus (writer)

The following describes embodiments of the present invention, including a character-string information output apparatus, a character-string information output system, a character-string output method, a character-string input apparatus, a character-string information input system, a character-string information input method, a storage medium and a character-string information recording apparatus.

First Embodiment

In the first embodiment, the character-string information output apparatus is embedded in an electrophotographic image processing apparatus. FIG. 1 is a block diagram illustrating the structure of an image writing apparatus (writer) according to the first embodiment. In FIG. 1, a microcomputer (CPU) 100 executes electrophotographic image processing.

A ROM 101 stores an electrophotographic image processing program (character-string command information input processing program) executed by the CPU 100 and other data. A RAM 102 is used as a working area of the electrophotographic image processing program, and as an area for temporarily storing image data read in from a camera portion 103.

The camera portion 103 is composed of a lens, a CCD and the like; it is operative to take in image data. A card drive 104 records the image data, which has been read in from the camera portion 103 and processed by the CPU 100, on a nonvolatile memory such as a compact flash card.

A CPU bus 105 connects the CPU 100, the ROM 101, the RAM 102, the camera portion 103, the card drive 104, an interface 106, an LCD 107 and an operation portion 108. The CPU bus 105 is a generic name for an address bus transferring address signals, a control bus transferring control signals, and a data bus transferring several kinds of data.

The interface (I/F) 106 communicates with external apparatuses such as a personal computer through a serial port or the like. The LCD 107 provides display of images photographed by the camera portion 103 so that the user can confirm the images. The operation portion 108 includes keys, switches and a release button that allow useris operation to register his or her name.

FIG. 2 is a block diagram illustrating the structure of an electrophotographic image processing apparatus (reader). In FIG. 2, a microcomputer (CPU) 200 executes electrophotographic image processing.

A ROM 201 stores an electrophotographic image processing program (character-string command information input processing program) executed by the CPU 200, font information and other data.

A RAM 202 is used as a working area of the electrophotographic image processing program, and as an area for temporarily storing image data and its related character-string information read in from a card read drive 204.

A printer 203 prints out images processed by the CPU 200. The card read drive 204 reads out an image, which has been taken by a digital camera or the like and stored on a PC card or the like, and its related character-string information.

A CPU bus 205 connects the CPU 200, the ROM 201, the RAM 202, the printer 203, the card read drive 204, an interface 206 and an operation portion 207. The CPU bus 205 is a generic name for an address bus transferring address signals, a control bus transferring control signals, and a data bus transferring several data.

The interface (I/F) 206 communicates with other digital apparatuses through a serial port or the like. The operation portion 207 includes keys and switches that allow useris operation to decide image data to be printed.

FIG. 3 is a flowchart illustrating the process to input character-string command information as electrophotographic image processing in the image writing apparatus (writer). The processing program is stored in the ROM 101 of the image writer and executed by the CPU 100. The processing is started in response to input of an instruction to input character-string information of specific content from the operation portion 108.

The image writing apparatus first executes support command processing that analyzes commands identical in information content to the character-string information to which the input instruction has been issued. For example, it analyzes the commands that can support the user's name (step S1).

Figure 4:
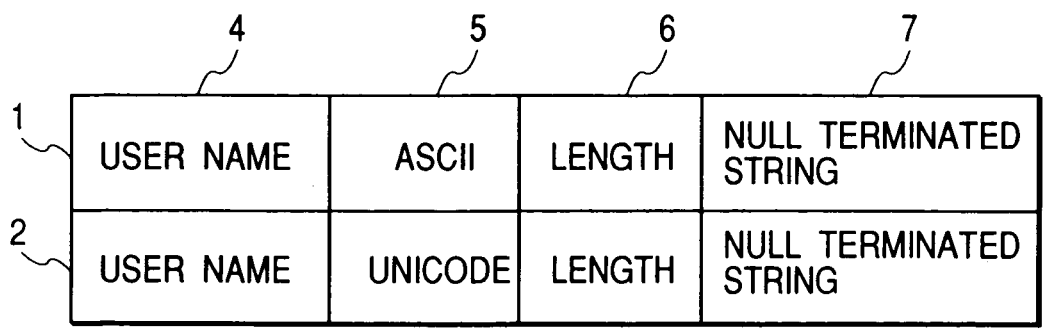
FIG. 4 is a diagram illustrating string-character commands that the image writer has recorded through a card drive 104 into a specific file (DPOF file) on a nonvolatile memory card such as a compact flash card.

FIG. 4 is a diagram illustrating character string commands that the image writing apparatus has recorded through the card drive 104 into a specific file (DPOF file) on a nonvolatile memory card such as a compact flash card. Command 1 stores a useris name in a character string of ASCII codes. Command 2 stores the same useris name in a Unicode character string. Each command is composed of a tag 4 indicative of the kind of command, a part indicative of the data type 5 to be stored, a part indicative of the command length 6 and a data part 7. Plural character-string commands for one user's name are thus stored in the DPOF file.

Turning back to FIG. 3, command termination processing is executed to determine whether the support commands analyzed in step 1 are all listed on the nonvolatile memory through the card drive 104 (step S2). If all the commands have been listed, the processing ends. If all the commands have not been listed yet, command input processing is executed to write, onto the nonvolatile memory through the card drive 104, one of the commands capable of supporting the content specified by the character-string input instruction (step S3). For example, either command 1 or command 2 shown in FIG. 4 is written. After that, the procedure returns to step S2.

Figure 5:
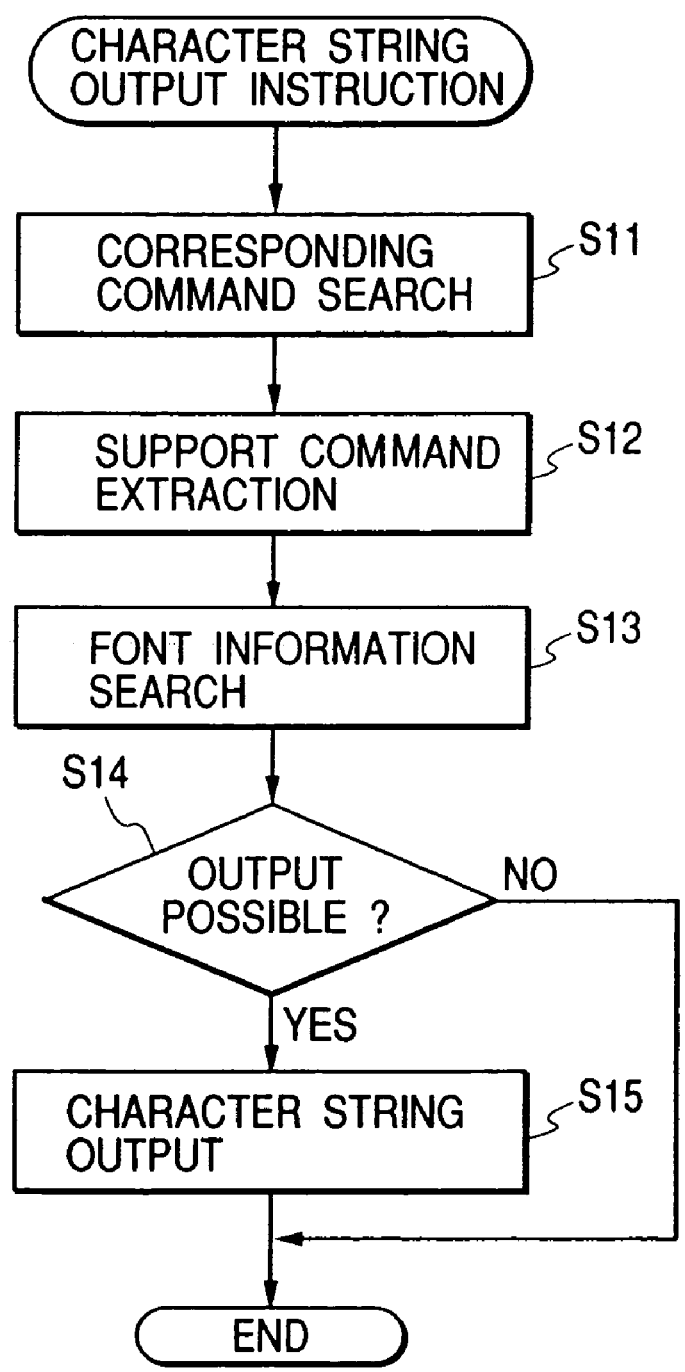
FIG. 5 is a flowchart illustrating the process to output character-string command information as the electrophotographic image processing in the electrophotographic image processing apparatus (reader)

FIG. 5 is a flowchart illustrating the process to output character-string information as electrophotographic image processing in the electrophotographic image processing apparatus (reader). The processing program is stored in the ROM 201 and executed by the CPU 200.

The processing program is started in response to input of an instruction from the operation portion 207 to output character-string information of specific content written in a specific file (DPOF file) that conforms with the DPOF standard.

The DPOF file on the nonvolatile memory is first searched through the card read drive 204 for all the commands that include the corresponding content (step S11). If the character-string information output instruction is issued for the useris name, searches for all the commands that include the useris name. For example, commands 1 and 2 are searched in the case shown in FIG. 4.

From among the searched commands, a command that the electrophotographic image processing apparatus can support is extracted (step S12). For example, of the commands shown in FIG. 4, if the electrophotographic image processing apparatus can interpret command 1 in ASCII code, but it cannot interpret command 2 in Unicode, only command 1 is regarded as a target command for the electrophotographic image processing apparatus.

Then, the ROM 201 is searched to determine whether the electrophotographic image processing apparatus has font information to output the character-string information included in the extracted command (step S13).

It is then determined, based on the font information searched, whether it is possible to output the character-string information (step S14). If possible to output, the character string is output (step S15), and the processing ends. The character string is output in step S15 as follows. The character-string information of the command searched from the DPOF file in accordance with the character-string output instruction is output to the printer 203 based on the font information stored in the ROM 201. After that, the processing ends. On the other hand, if it is determined in step S14 that it is impossible to output the character-string information, the processing ends as it stands.

If the electrophotographic image processing apparatus has no font information corresponding to the character-string information of the command extracted in step S12, it may output the character-string information based on another font information, or it may output nothing after all.

If it is found in step S14 that the electrophotographic image processing apparatus can output plural types of commands, it can decide which command should be output based on predetermined priorities stored in the ROM 201, or it can leave the selection to the useris discretion.

Thus, the image writing apparatus can write down plural commands corresponding to the languages that the image writer supports, while the electrophotographic image processing apparatus can selectively output at least one command corresponding to the language that the electrophotographic image processing apparatus supports. It is therefore possible to prevent any error in printing or displaying the character-string information.

It should be noted that commands used in the embodiment, such as ones as illustrated in FIG. 4, are all written in data formats based on standards such as DPOF to which the electrophotographic image processing apparatus conforms.

Further, in the embodiment, the image writing apparatus (writer) and the electrophotographic image processing apparatus (reader) are separately provided in the system, but both may be formed as one unit. For example, if a camera with a display provides functions for a user to input his or her useris name and confirm it on the display, both the writer and reader facilities can be embodied in the camera.

Furthermore, in the embodiment, the means for transmitting information from the writer to the reader is illustrated as a nonvolatile memory for use with the card drive 104 of FIG. 1 and the card read drive 204 of FIG. 2. But, instead of using the nonvolatile memory, the information may be transmitted through the interface 106 of FIG. 1 and the interface 206 of FIG. 2.

Furthermore, the embodiment takes an electrophotographic image processing apparatus as an example of reader, but the present invention is not limited to the embodiment and it is applicable to other types of image reader such as a video deck.

The present invention is also applicable to both a system composed of plural pieces of equipment and a single apparatus. Further, the present invention is applicable to a program to be implemented in the system or apparatus. In this case, the program represented by software that realizes the present invention is stored in a storage medium so that the system or apparatus can read out the program from the storage medium. The storage medium thus allows the system or apparatus to take advantage of the present invention.

Figure 6A:
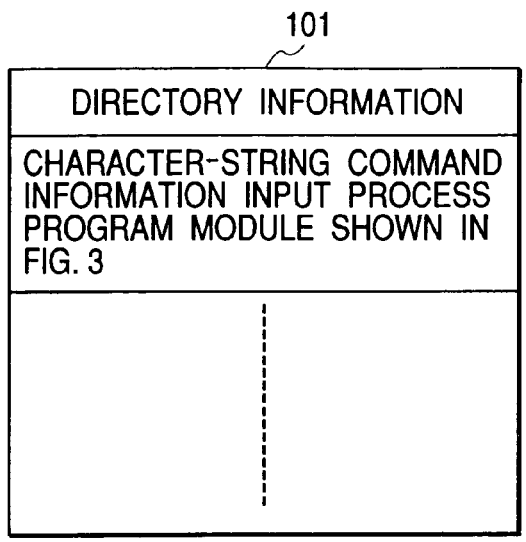
FIGS. 6A, 6B and 6C are diagrams illustrating memory maps on ROMs 101 and 201 as storage media.
Figure 6B:
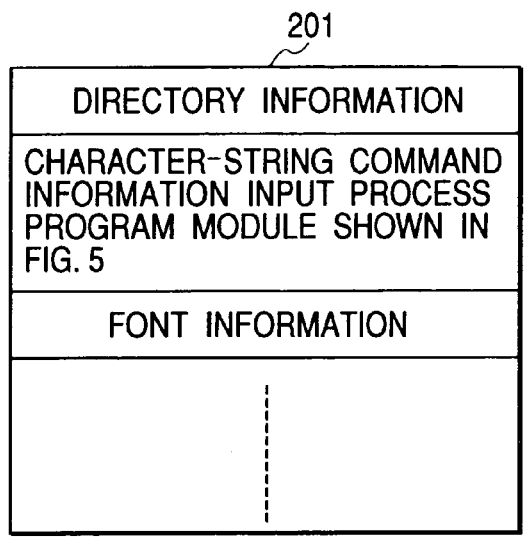
Figure 6C:
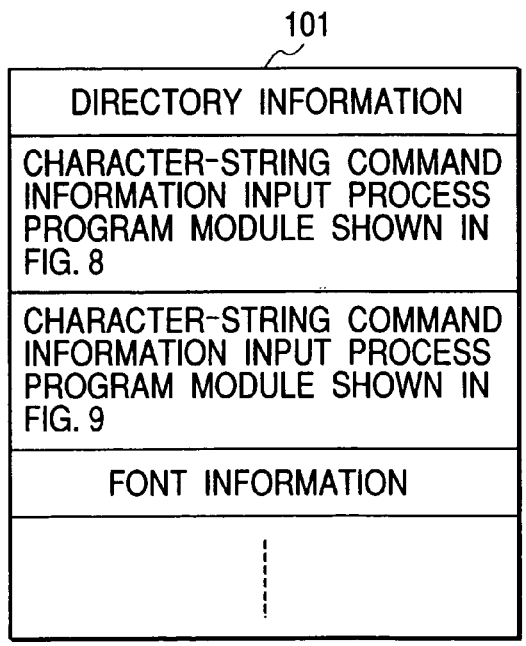

FIGS. 6A to 6C show memory maps on the ROMs 101 and 201 as storage media. FIG. 6A is a memory map on the ROM 101, on which several kinds of information including a program module for character-string command information input processing, as illustrated in the flowchart of FIG. 3, are stored. FIG. 6B shows a memory map on the ROM 201, on which several kinds of information including a program module for character-string command information input processing, as illustrated in the flowchart of FIG. 5, and the font information are stored. FIG. 6C shows another memory map on the ROM 101, on which several kinds of information including a program module for character-string command information input processing according to the second embodiment, as will be described later along a flowchart of FIG. 8, a program module for character-string information input processing according to the third embodiment, as will be described later along a flowchart of FIG. 9, and the font information are stored. The storage medium that supplies these program modules may be a floppy disk, a hard disk, an optical disk, a magneto-optical disk, a CD-ROM, a CD-R, a DVD, a magnetic tape and a nonvolatile memory card.

Second Embodiment

The second embodiment illustrates a case in which the present invention is applied to a digital camera having a function as a writer. FIG. 7 is a front view illustrating the appearance of a digital camera according to the second embodiment. Arranged on the front side of the camera body are the LCD 107 and the operation portion 108 shown in the first embodiment. Since the basic hardware configuration of the digital camera is the same as that of the first embodiment, portions identical to those in the first embodiment are given the same reference numbers to omit the description.

The operation portion 108 has ten keys 111 for input of character string information. These ten keys 111 are capable of inputting Kana, Kanji or alphanumeric characters depending on the input mode selected. The operation portion 108 also has an input-mode selection key 112, a Kana-Kanji conversion key 113, a decision key 114, and a menu key 115 that makes an operation menu displayed.

The LCD 107 displays not only an image to be photographed or a photographed image, but also character information such as menu information to instruct the user to select a character input mode and character string information input by the user.

Figure 8:
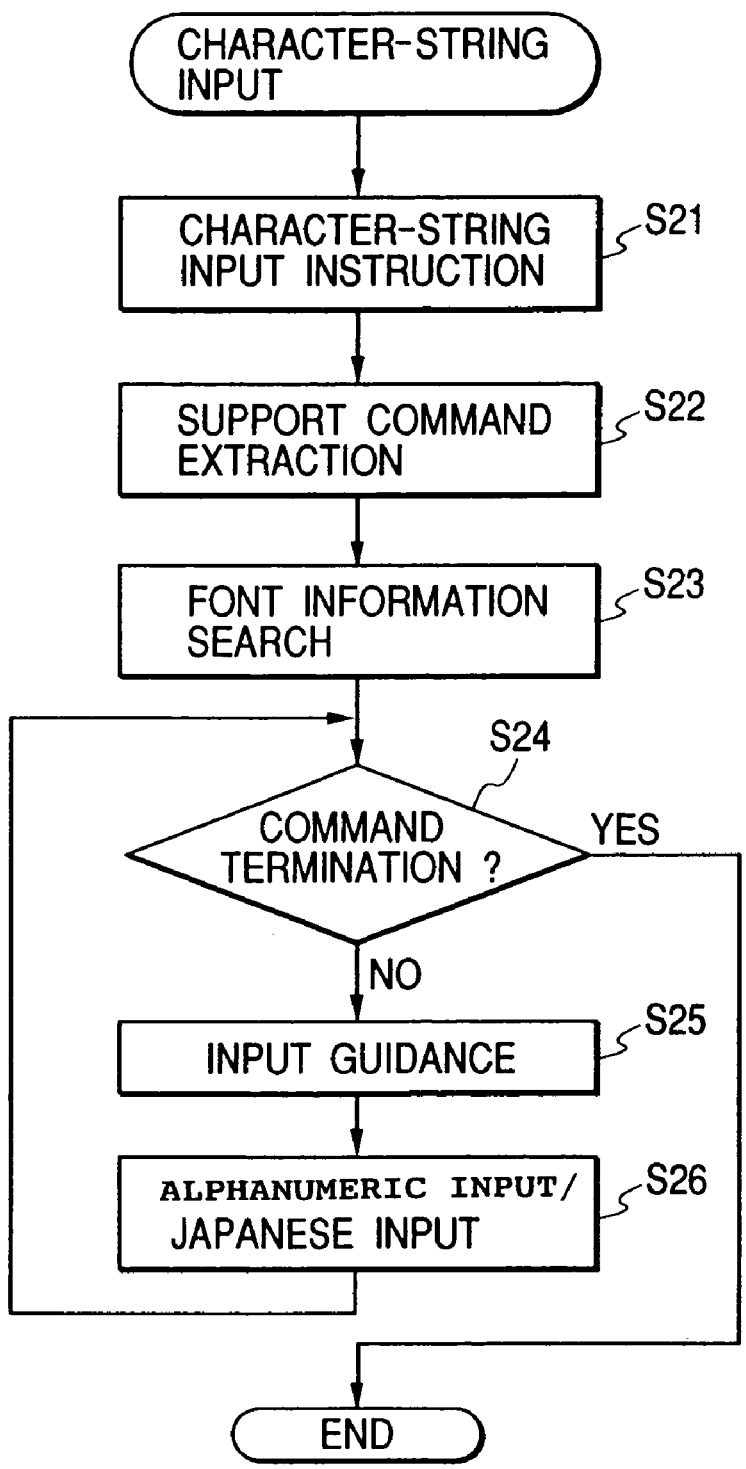
FIG. 8 is a flowchart illustrating the process to input character-string command information according to the second embodiment of the present invention.

The following illustrates how to input character-string command information through the operation portion 108 and the LCD 107 of the digital camera. FIG. 8 is a flowchart illustrating the process to input character-string command information according to the second embodiment. The processing program is stored in the ROM 101 mounted in the digital camera, and executed by the CPU 100. It is started in response to input of an instruction from the operation portion 108 to input character string information of specific content.

The user first uses the menu key and others on the operation portion 108 to issue an input instruction of a character string such as his or her name (step S21). Upon receipt of the character-string input instruction, support command extraction is executed (step S22). In the support command extraction processing, the digital camera used as a writer (character-string information input apparatus) analyzes information identical in content such as the number of commands that the digital camera can support for the useris name. In this case, command 1 written as an ASCII character string and command 2 written as a Unicode character string are regarded as supportable or compatible character strings (refer to FIG. 4).

Then, font information search is executed (step S23). For example, in the font information search processing, a search is made for font information that provides representations of the Unicode command 2 on the LCD 107. The embodiment assumes that the digital camera can support both alphanumeric character strings in ASCII code and Japanese Kana-Kanji character strings in Unicode.

Based on the information determined at steps S22 and S23, the number of combinations of commands and languages the user can input is checked to determine whether the next character-string information input processing of steps S25 and S26 is completed (step S24). In the embodiment, it is determined whether both the step of inputting command 1 as an alphanumeric character string in ASCII code, and the step of inputting command 2 as a Kana-Kanji character string in Unicode are completed.

If determined at step S24 that the character-string information input processing is completed, the processing ends. On the other hand, if determined at step S24 that the character-string information input processing is not completed, character-string input guidance is given to the user as a display on the LCD 107 (step S25) to urge the user to input a character string. The character-string input guidance shows, as the display on the LCD 107, commands and languages that the digital camera supports. Then, after the user inputs a character string, the procedure returns to step S24.

In the case where the character-string input guidance of step S25 is given for the first time, the user is urged to input his or her name as an alphanumeric character string in ASCII code. Then, in the character-string input processing of step S26, the user inputs an alphanumeric character string by pushing the input-mode selection key 112 and the ten keys 111 on the operation portion 108, and decides the character string by pushing the decision key 114 to end the input process. After completion of the input processing, command 1 with the ASCII character string is written onto the nonvolatile memory through the card drive 104.

Next time the character-string input guidance of step S25 is given, the user is urged to input his or her name in Japanese as a Unicode character string. Then, in the character-string input processing of step S26, the user inputs a Japanese character string consisting of Kana and Kanji characters by pushing the input-mode selection key 112 and the ten keys 111 on the operation portion 108, and decides the character string by pushing the decision key 114 to end the input process. After completion of the input processing, command 2 with the Unicode character string is written onto the nonvolatile memory through the card drive 104.

In the second embodiment, the character-string input guidance is given to the user as a display on the LCD 107 to urge the user to input character strings step by step, thus improving its operability.

Third Embodiment

The third embodiment is also applied to a digital camera similar in type to that of the second embodiment. However, the third embodiment is different from the second embodiment in that the third embodiment can store plural commands that the digital camera automatically supports in response to one-time character-string input from the user. In contrast, the second embodiment requires the user to perform character-string input for each individual command and language that can be input in the character-string input process.

Figure 9:
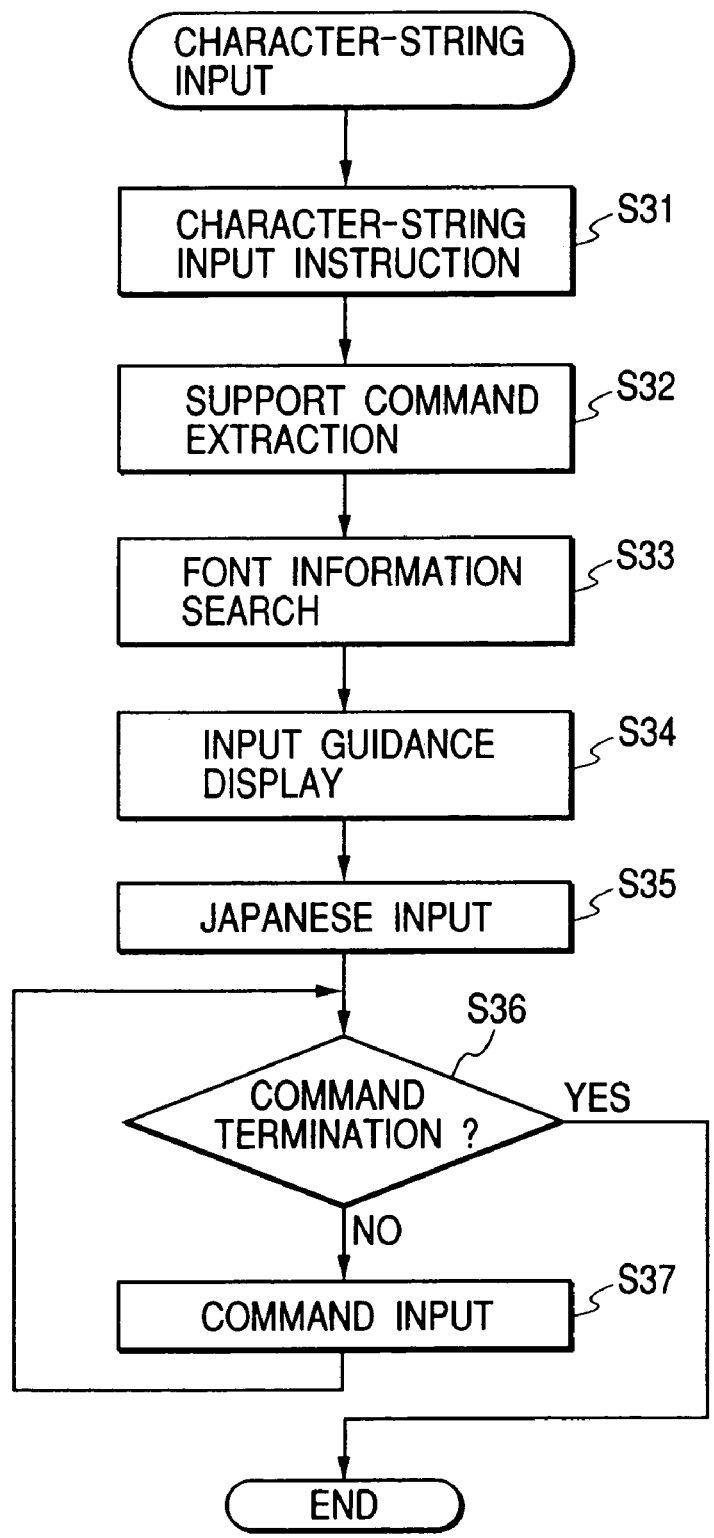
FIG. 9 is a flowchart illustrating the process to input character-string command information according to a third embodiment of the present invention.

FIG. 9 is a flowchart illustrating the process to input character-string command information according to a third embodiment of the present invention. The processing program is stored in the ROM 101 mounted in the digital camera, and executed by the CPU 100.

The user first uses the menu key and others on the operation portion 108 to issue an input instruction of a character string such as his or her name (step S31). Upon receipt of the character-string input instruction, support command extraction is executed (step S32). In the support command extraction processing, the digital camera used as a writer (character-string information input apparatus) analyzes information identical in content such as the number of commands that the digital camera can support for the useris name. The embodiment assumes that the digital camera can support command 1 as an ASCII character string and command 2 as a Unicode character string, both of which are shown as command examples in FIG. 4.

Then, font information search is executed (step S33). For example, in the font information search processing, a search is made for font information that provides representations of the Unicode command 2 on the LCD 107. As mentioned above, the embodiment assumes that the digital camera can support both alphanumeric character strings in ASCII code and Japanese Kana-Kanji character strings in Unicode.

Then, input guidance is given to the user as a display to urge the user to input his or her name in Japanese (step S34). In the character-string input processing, the user inputs a Japanese character string consisting of Kana and Kanji characters by pushing the input-mode selection key 112 and the ten keys 111 on the operation portion 108, and decides the character string by pushing the decision key 114 to end the input process (step S35).

Based on the information determined at steps S32 and S33, the number of combinations of commands and languages the user can input is checked to determine whether the character-string information command input processing is completed (step S36). In the embodiment, since both the step of inputting command 1 as an alphanumeric character string in ASCII code and the step of inputting command 2 as a Kana-Kanji character string in Unicode are possible, it is determined whether both steps of command input are completed or not. If one of the command input steps is not completed, an incomplete character-string command to be inputted in each command input process is written onto the nonvolatile memory through the card drive 104 (step S37). After that, the procedure returns to step S36. On the other hand, if both the command input steps are completed, the processing ends that instant.

In the first command input processing of step S37, the Japanese character string inputted at step S35 is converted into command 1 of an ASCII character string and written onto the nonvolatile memory through the card drive 104.

In the next processing of step S37, the Japanese character string inputted at step S35 is converted into command 2 of a Unicode character string and written onto the nonvolatile memory through the card drive 104.

Thus, the third embodiment can store plural commands that the digital camera automatically supports in response to one-time character-string input from the user.

As described above, the present invention allows specific character codes different from each other to be recorded on a recording medium as different commands. Of these commands, the command that the output apparatus can interpret can be selectively used to make an output. This makes it possible to avoid any confusion due to a difference between character-string commands, and hence to provide a character-string information output apparatus with improved expandability.

What is claimed is:

1. A character-string information output apparatus for outputting character-string information supported by a predetermined character encoding scheme, comprising:
   search means for searching, from an external memory, the character-string information having identical contents and supported by a plurality of different character encoding schemes, in a case where it is instructed to output the character-string information,
   extraction means for extracting the character encoding scheme interpretable by said character-string information output apparatus from the character encoding schemes supporting the character-string information searched by said search means;

font information search means for searching font information corresponding to the character-string information supported by the extracted character encoding scheme; and character-string information output means for outputting the character-string information supported by the extracted character encoding schemes, wherein said character-string information output means outputs the character-string information based on the searched font information and is arranged so that, if said character-string information output apparatus does not have the font information corresponding to the character-string information supported by the extracted character encoding scheme, said character-string information output means outputs the character-string information by using another font information.

2. A character-string information output apparatus for outputting character-string information supported by a predetermined character encoding scheme, comprising:

search means for searching, from an external memory, the character-string information having identical contents and supported by a plurality of different character encoding schemes, in a case where it is instructed to output the character-string information;

extraction means for extracting the character encoding scheme interpretable by said character-string information output apparatus from the character encoding schemes supporting the character-string information searched by said search means;

font information search means for searching font information corresponding to the character-string information supported by the extracted character encoding scheme; and character-string information output means for outputting the character-string information supported by the extracted character encoding scheme, wherein said character-string information output means outputs the character-string information based on the searched front information and is arranged so that if said character-string information output apparatus does not have the font information corresponding to the character-string information supported by the extracted character encoding scheme, said character-string information output means does not output the character-string information.

3. A character-string information output apparatus according to claim 1 or 2, wherein said character-string information output means outputs the character-string information supported by the character encoding scheme capable of responding to only a limited language and the character-string information supported by the character encoding scheme capable of responding to a plurality of languages.

4. A character-string information output apparatus according to claim 1 or 2, wherein said character-string information output means automatically selects the character encoding scheme extracted by said extraction means and outputs the character-string information supported by the selected character encoding scheme.

5. A character-string information output system provided with a character-string information recording apparatus and a character-string information output apparatus, wherein said character-string information recording apparatus comprises:

analyzing means for analyzing a plurality of different character encoding schemes supporting character-string information having contents identical with contents of inputted character-string information; and recording means for recording the character-string information supported by the plurality of the analyzed character encoding schemes in an external memory, and said character-string information output apparatus comprises:

search means for searching, from the external memory, the character-string information having identical contents and supported by the plurality of different character encoding schemes, in a case where it is instructed to output the character-string information;

extraction means for extracting the character encoding scheme interpretable by said character-string information output apparatus from the character encoding schemes supporting the character-string information searched by said search means;

font information search means for searching font information corresponding to the character-string information supported by the extracted character encoding scheme; and character-string information output means for outputting the character-string information supported by the extracted character encoding scheme, wherein said character-string information output means outputs the character-string information based on the searched font information and is arranged so that if said character-string information output apparatus does not have the font information corresponding to the character-string information supported by the extracted character encoding scheme, said character-string information output means outputs the character-string information by using another font information or does not output the character string information.

6. A character-string information output method comprising the steps of:

analyzing a plurality of different character encoding schemes supporting character-string information having contents identical with contents of inputted character-string information;

recording the character-string information supported by the plurality of the analyzed character encoding schemes in an external memory;

searching, from the external memory, the character-string information having identical contents and supported by the plurality of different character encoding schemes, in a case where it is instructed to output the character-string information;

extracting an interpretable character encoding scheme from the character encoding schemes supporting the character-string information searched in said search step;

searching font information corresponding to the character-string information supported by the extracted character encoding scheme; and outputting the character-string information supported by the extracted character encoding scheme, wherein said character-string information output step outputs the character-string information based on the searched font information and is arranged so that if said character-string information output method does not have the font information corresponding to the character-string information supported by the extracted character encoding scheme, said character-string information output step outputs the character-string information by using another font information or does not output the character-string information.

7. A storage medium in which a computer-readable program is stored, wherein said program comprises the steps of:
analyzing a plurality of different character encoding schemes supporting character-string information having contents identical with contents of inputted character-string information;
recording the character-string information supported by the plurality of the analyzed character encoding schemes in an external memory;
searching, from the external memory, the character-string information having identical contents and supported by the plurality of different character encoding schemes, in a case where it is instructed to output the character-string information;
extracting an interpretable character encoding scheme from the character encoding schemes supporting the character-string information searched in said search step;
searching font information corresponding to the character-string information supported by the extracted character encoding scheme; and
outputting the character-string information supported by the extracted character encoding scheme,
wherein said character-string information output step outputs the character-string information based on the searched font information and is arranged so that if said program does not have the font information corresponding to the character-string information supported by the extracted character encoding scheme, said character-string information output step outputs the character-string information by using another font information or does not output the character-string information.

8. A character-string information output method for outputting character-string information being supported by a predetermined character encoding scheme, comprising the steps of:
searching, from an external memory, the character-string information having identical contents and supported by a plurality of different character encoding schemes, in a case where it is instructed to output the character-string information;
extracting an interpretable character encoding scheme from the character encoding schemes supporting the searched character-string information;
searching font information corresponding to the character-string information supported by the extracted character encoding scheme; and
outputting the character string information supported by the extracted character encoding scheme,
wherein said character-string information output step outputs the character-string information based on the searched font information and is arranged so that if said character-string information output method does not have the font information corresponding to the character-string information supported by the extracted character encoding scheme, said character-string information output step outputs the character-string information by using another font information.

9. A storage medium in which a computer-readable program is stored, wherein said program comprises the steps of:
searching, from an external memory, the character-string information having identical contents and supported by a plurality of different character encoding schemes, in a case where it is instructed to output the character-string information;
extracting an interpretable character encoding scheme from the character encoding schemes supporting the searched character-string information; and
searching font information corresponding to the character-string information supported by the extracted character encoding scheme; and
outputting the character-string information supported by the extracted character encoding scheme,
wherein said character-string information output step outputs the character-string information based on the searched font information and is arranged so that if said program does not have the font information corresponding to the character-string information supported by the extracted character encoding scheme, said character-string information output step outputs the character-string information by using another font information.

10. A character-string information output method for outputting character-string information being supported by a predetermined character encoding scheme, comprising the steps of:
searching, from an external memory, the character-string information having identical contents and supported by a plurality of different character encoding schemes, in a case where it is instructed to output the character-string information;
extracting an interpretable character encoding scheme from the character encoding schemes supporting the searched character-string information;
searching front information corresponding to the character-string information supported by the extracted character encoding scheme; and
outputting the character-string information supported by the extracted character encoding schemes
wherein said character-string information output step outputs the character-string information based on the searched font information and is arranged so that if said character-string information output method does not have the font information corresponding to the character-string information supported by the extracted character encoding scheme, said character-string information output step does not output the character-string information.

11. A storage medium in which a computer-readable program is stored, wherein said program comprises the steps of:
searching, from an external memory, the character-string information having identical contents and supported by a plurality of different character encoding schemes, in a case where it is instructed to output the character-string information;
extracting an interpretable character encoding scheme from the character encoding schemes supporting the searched character-string information;
searching font information correspondent to the character-string information supported by the extracted character encoding scheme; and
outputting the character-string information supported by the extracted character encoding scheme,
wherein said character-string information output step outputs the character-string information based on the searched front information and is arranged so that if said program does not have the font information corresponding to the character-string information supported by the extracted character encoding scheme, said character-string information output step does not output the character-string information.

* * * * *

UNITED STATES PATENT AND TRADEMARK OFFICE
CERTIFICATE OF CORRECTION

PATENT NO. : 6,967,655 B1 Page 1 of 1
APPLICATION NO. : 09/546682
DATED : November 22, 2005
INVENTOR(S) : Goto It is certified that error appears in the above-identified patent and that said Letters Patent is hereby corrected as shown below:

In all of the following occurrences, "useris" should read --user's --:

Column 1, line 41;
Column 3, lines 27 and 54;
Column 4, lines 41 and 42;
Column 5, lines 10 and 28;
Column 6, line 49; and
Column 7, line 66.

At Column 12, line 33, "schemes" should read --scheme; --.

Signed and Sealed this

Twenty-ninth Day of August, 2006

JON W. DUDAS
*Director of the United States Patent and Trademark Office*